Dec. 16, 1958      R. M. FRINK      2,864,591
CORRUGATED TUBING
Filed July 2, 1956
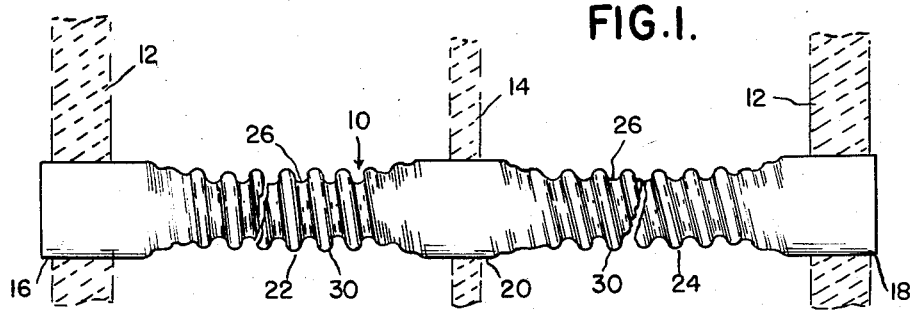
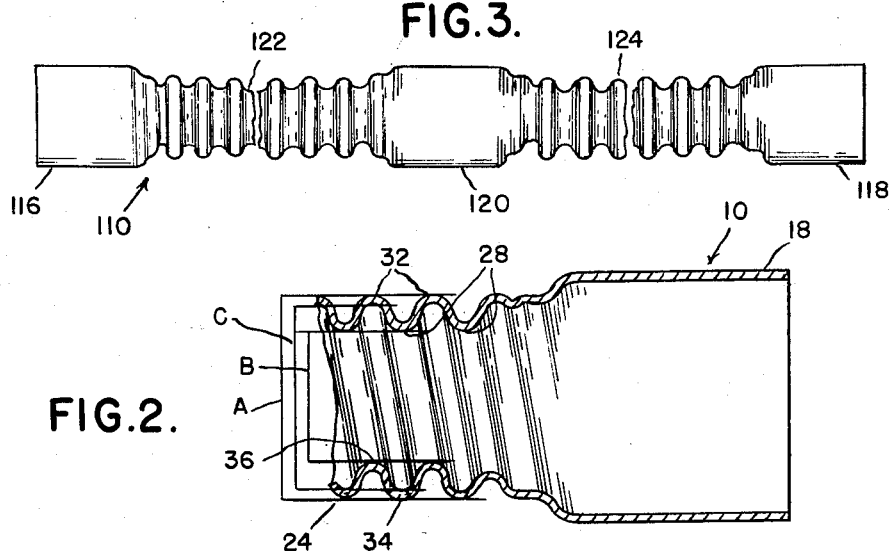
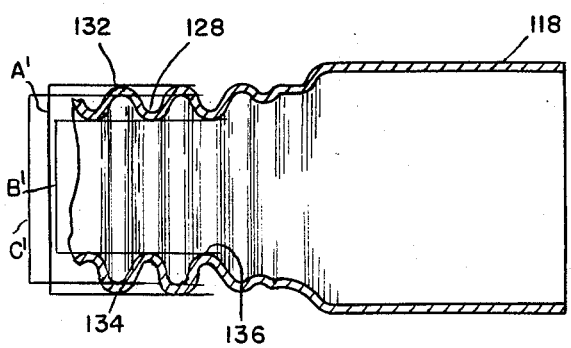
INVENTOR.
RUSSELL M. FRINK
BY
Whittemore, Hulbert & Belknap
ATTORNEYS United States Patent Office 2,864,591
Patented Dec. 16, 1958

2,864,591

CORRUGATED TUBING

Russell M. Frink, Bloomfield Hills, Mich., assignor to Calumet & Hecla, Inc., Calumet, Mich., a corporation of Michigan Application July 2, 1956, Serial No. 595,343

3 Claims. (Cl. 257—262.23)

This invention relates to tubing for use in heat exchange devices and refers more particularly to corrugated tubing.

One object of this invention is to provide a tube for use in heat exchange devices which is adapted to produce turbulence in the fluid moving through it and thereby improve the heat transfer characteristics of the tube.

Another object of the invention is to provide a tube which is capable of being inexpensively manufactured and yet which is highly effective in the performance of its intended function.

Still another object of the invention is to provide a corrugated tube having the characteristics described above which may be readily substituted in heat exchangers for plain tubes.

A further object of the invention is to provide a tube for a heat exchange device which has a corrugated portion designed to produce greater turbulence of fluid moving through the tube and correspondingly greater heat transferability.

Another object is to provide a tube having a corrugated portion of reduced diameter relative to the plain portion so as to increase the velocity of the fluid moving through the corrugated portion and thus increase the turbulence.

Another object of the invention is to provide a corrugated tube, as described above, having a helical corrugation along a portion of its length.

Still another object is to provide a corrugated tube having a plurality of circumferentially extending longitudinally spaced corrugations.

Other objects of the invention will be apparent as the following description proceeds, especially when considered with the accompanying drawing, wherein:

Figure 1 is a side elevational view of a tube embodying the present invention, the tube being shown associated with the headers and tube sheet of a heat exchanger.

Figure 2 is an enlarged sectional view of one end portion of the tube.

Figures 3 and 4 are similar to Figures 1 and 2 respectively, and illustrate a modification.

Referring now more particularly to Figures 1 and 2, an open ended tube 10 is there illustrated, shown in association with headers 12 and a tube sheet 14 which are shown in dotted lines. The tube 10 is formed from a length of plain cylindrical tubing of uniform wall thickness throughout its length. The material selected for the tube may vary, but, in general, is selected from a group having relatively high heat transfer characteristics.

The tube 10 comprises the cylindrical plain end portions 16 and 18 and the cylindrical plain portion 20 between the end portions. Intermediate portions 22 and 24 are located between the plain portion 20 and the plain end portions 16 and 18.

The intermediate portions 22 and 24 are each corrugated as illustrated. The tube may be formed with corrugations in any desired manner and, for example, a forming disc may be employed with its axis of rotation arranged obliquely with respect to the axis of the tube and with the periphery of the disc bearing against the outer surface of the tube to form a helical groove while at the same time feeding the tube axially and rotating it.

The corrugated intermediate portions 22 and 24 have an undulating configuration in longitudinal section as illustrated. Each intermediate portion has a helical radially inwardly extending corrugation 26, each convolution of the corrugation being indicated at 28. The undulating configuration of each intermediate portion also provides, in effect, a helical radially outwardly extending corrugation 30, each convolution of the corrugation being indicated at 32.

The crests 34 of the convolutions 32 are of the same diameter, as will appear from dimension line A in Figure 2, except at the ends of the corrugated portions where the convolutions gradually disappear and merge into the plain portions.

The maximum outside diameter of the corrugated portions of the tube, or of crests 34, is less than the outside diameters of the plain portions 16, 18 and 20 which latter have the same inside diameter and the same outside diameter. As a result of this relationship, it is a simple matter to insert tubes 10 into the headers and tube sheets 12 and 14 of a heat exchanger, or to substitute tubes 10 for plain tubes. The tubes 10 may be slid endwise into assembled relationship with the headers and tube sheet without interference from the corrugated portions which are of less diameter than the plain portions.

The crests 36 of the convolutions 28 are of the same inside diameter as will appear from dimension line B in Figure 2 except at the ends of the convolutions where such convolutions gradually disappear and merge into the plain portions. The convolutions 28 are rather narrow so that the angle formed between the sides thereof and the axis of the tube is greater than 45 degrees. Moreover, the minimum inside diameter of the convolutions 28 is substantially less than the inside diameter of the plain portions. As a result, the convolutions 28 have a substantial wiping action on the fluid passing through the tube, greatly increasing the turbulence of fluid moving through the corrugated portions of the tube and correspondingly increasing the heat transferability of the tube.

It will also be noted that the maximum inside diameter of the corrugated portions of the tube, indicated by dimension line C in Figure 2, is less than the inside diameter of the plain portions. Fluid moving through the tube 10 will thus have an increased velocity in the corrugated portions as a result of the reduced inside diameter thereof. Such increased velocity will increase the turbulence of the fluid. The reduced maximum inside diameter of the corrugated portions also increases the wiping action of the convolutions 28.

A tube 10 has thus been provided which is capable of being inexpensively manufactured, and yet which produces a high degree of turbulence of the fluid moving through the tube to promote better heat transfer. The undulating configuration also provides, in effect, fins on the outer surface of the tube to further increase heat transfer. The tube, it will be noted, is of uniform wall thickness throughout its length.

Figures 3 and 4 illustrate a modification. The tube 110 is exactly like the tube 10 except for the shape of the intermediate portions 122 and 124. The tube 10 has the cylindrical plain end portions 116 and 118 and the cylindrical plain portion 120 between the end portions.

The intermediate portions 122 and 124 are each corrugated as illustrated so as to have an undulating configuration in longitudinal section. Each intermediate portion has a plurality of circumferentially extending longitudinally spaced radially inwardly extending corrugations 128 which are disposed in a plane at right angles to the tube axis. The corrugations 128 are similar to the convolutions 28 shown in the previous embodiment except that whereas the convolutions 28 extend helically and connect end to end in adjacent convolutions to provide a continuous helical corrugation, the corrugations 128 are separate and spaced from each other. The undulating configuration of each intermediate portion also provides, in effect, radially outwardly extending corrugations 132 between adjacent corrugations 128, the corrugations 130 being disposed in planes at right angles to the tube axis.

The crests 134 of the corrugations 132 are of the same diameter, as will appear from dimension line $A^1$ in Figure 4, except at the ends of the corrugated portions where the corrugations gradually disappear and merge into the plain portions.

The maximum outside diameter of the corrugated portions of the tube, or crests 134, is less than the outside diameters of the plain portions 116, 118 and 120 which latter have the same inside diameter and the same outside diameter. The tubes 110 can be inserted into the headers and tube sheets 12 and 14 of a heat exchanger or substituted for plain tubes without interference from the corrugated portions which are of less diameter than the plain portions.

The crests 136 of corrugations 128 are of the same inside diameter as will appear from dimension line $B^1$ in Figure 4 except at the ends of the corrugated portions where the corrugations gradually disappear and merge into the plain portions. The corrugations 128 are rather narrow so that the angle formed between the sides thereof and the axis of the tube is greater than 45 degrees. Moreover, the minimum inside diameter of the corrugations 128 is substantially less than the inside diameter of the plain portions. As a result, the corrugations 128 have a substantial wiping action on the fluid, greatly increasing the turbulence of fluid moving through the corrugated portions of the tube and correspondingly increasing the heat transferability of the tube.

The maximum inside diameter of the corrugated portions, indicated by dimension line $C^1$ in Figure 4, is less than the inside diameter of the plain portions so as to increase the velocity of the fluid in the corrugated portions and thus increase the turbulence of the fluid. The reduced maximum inside diameter of the corrugated portions also increases the wiping action of the corrugations 128.

Whereas the helically corrugated tube 10 in Figures 1 and 2 imparts a swirling or rotating turbulence to the fluid passing through it, the corrugations of the tube 110 produces more of a boiling or irregular turbulence.

The drawings and the foregoing specification constitute a description of the improved corrugated tubing in such full, clear, concise and exact terms as to enable any person skilled in the art to practice the invention, the scope of which is indicated by the appended claims.

What I claim as my invention is:

1. A heat exchange tube adapted to carry a fluid, said tube having longitudinally spaced cylindrical portions and an intermediate portion, said intermediate portion being corrugated throughout its circumference to provide the same with an undulating configuration in longitudinal section in which the undulations are smooth and free of abrupt and sharp changes in direction, the maximum inside cross-sectional area of said intermediate portion being less than the minimum inside cross-sectional area of each of said spaced portions to increase the velocity of and the wiping action on fluid moving through said intermediate portion, thereby increasing the turbulence of the fluid moving through said heat exchange tube and affording more effective heat exchange, the ends of said intermediate portion flaring radially outwardly and blending into said cylindrical portions and the undulations at said flared ends gradually flattening out and likewise blending into said cylindrical portions.

2. A heat exchange tube as in claim 1 in which said intermediate portion is formed with a helical corrugation having a plurality of continuous convolutions.

3. A heat exchange tube as in claim 1 in which said intermediate portion is formed with a plurality of circumferentially extending longitudinally spaced annular corrugations disposed in planes at right angle to the tube axis.

References Cited in the file of this patent

UNITED STATES PATENTS

| | | |
|---|---|---|
| 1,315,853 | Nordling | Sept. 9, 1919 |
| 1,842,095 | Hoffman | Jan. 19, 1932 |
| 1,913,573 | Turner | June 13, 1933 |
| 1,993,095 | Heinrich | Mar. 5, 1935 |
| 2,068,958 | McConkey | Jan. 26, 1937 |
| 2,139,367 | Kearney | Dec. 6, 1938 |
| 2,252,045 | Spanner | Aug. 12, 1941 |
| 2,362,694 | Hill | Nov. 14, 1944 |
| 2,417,661 | Rosales | Mar. 18, 1947 |
| 2,621,900 | Borg | Dec. 16, 1952 |

FOREIGN PATENTS

| | | |
|---|---|---|
| 221,024 | Germany | Dec. 17, 1908 |
| 219,788 | Great Britain | Aug. 7, 1924 |
| 309,294 | Italy | July 1, 1933 |
| 37,124 | Netherlands | Dec. 16, 1935 |